No. 79,813. PATENTED JULY 14, 1868.
L. H. DAVIS.
GRAIN SEPARATOR.
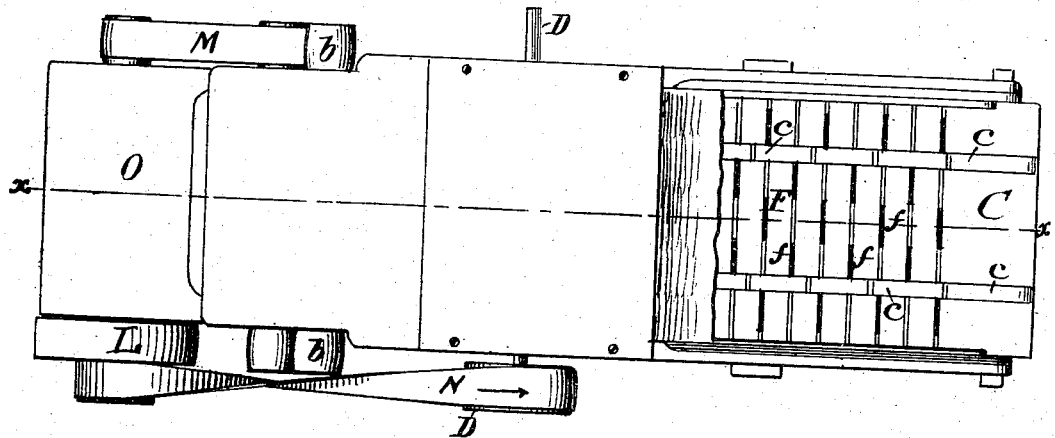
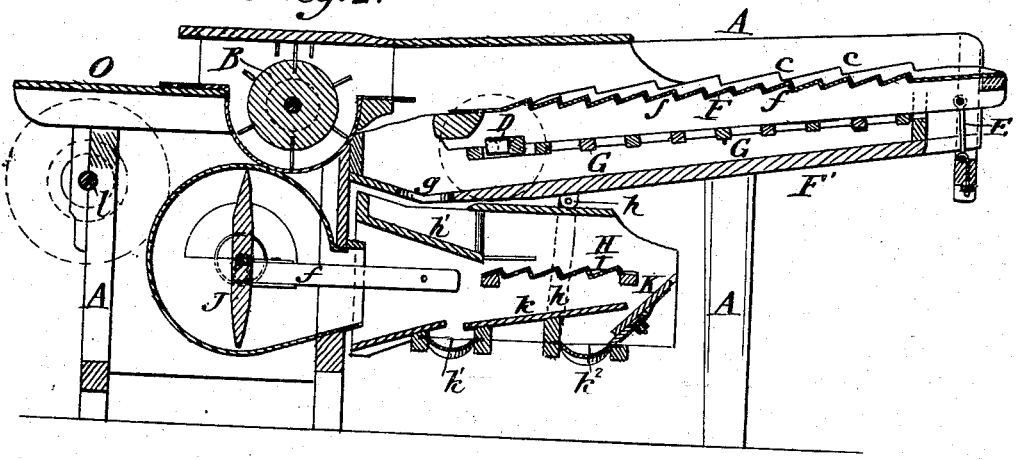

United States Patent Office.

LEVIS H. DAVIS, OF NEWARK, DELAWARE, ASSIGNOR TO CASHO AND COMPANY, OF THE SAME PLACE.

Letters Patent No. 79,813, dated July 14, 1868.

IMPROVEMENT IN GRAIN-SEPARATORS.

*The Schedule referred to in these Letters Patent and making part of the same.*

TO ALL WHOM IT MAY CONCERN:

Be it known that I, LEVIS H. DAVIS, of Newark, in the county of New Castle, and State of Delaware, have invented certain new and useful Improvements in Grain-Separators, of which the following is a full, clear, and exact description, reference being had to the accompanying drawings, which make part of this specification, and in which—

Figure 1 represents a plan or top view of my improved machine, and

Figure 2 a vertical longitudinal central section through the same at the line $x\ x$ of fig. 1.

Figure 3 is a side view of the counter-balanced pulley, which drives the crank-shaft which vibrates the shaking-shoe.

The invention herein claimed consists—

First, in a novel method of constructing the screen of a grain-separator with transverse corrugations and rectangular openings for the escape of the grain.

Second, in a novel method of combining with a longitudinally vibrating stair-shaped screen, notched ribs to carry off the straw.

Third, in a novel method of combining with a longitudinally reciprocating screen, rakes or scrapers, to remove the grain and chaff, as they escape through the screen.

Fourth, in a novel method of combining two longitudinally vibrating shaking-shoes with the threshing and winnowing-mechanism.

Fifth, in a novel method of constructing the lower shoe.

In the accompanying drawings a stout main frame, A, is shown as mounted upon suitable supports. A threshing-cylinder, B, and concave, of the usual construction, are arranged near the front of the frame.

A longitudinally vibrating shaking-shoe, C, is supported at its front end by a cranked shaft, D, and at its rear end by a radius bar or rocking-frame, E, pivoted to a cross-bar on the frame.

The shoe is provided with longitudinal ratchet-edged ribs $c$, to carry back the straw, and with a transversely corrugated bottom, F, having perforations $f$ in the vertical part of the corrugations, for the passage of the grain. A series of rakes, G, are arranged transversely beneath this bottom to draw the grain forward towards an opening, $g$, in the bottom.

A second longitudinally vibrating shaking-shoe, H, is suspended beneath the other by radius bars $h$, and is provided with a screen, I, corrugated and perforated like the one above mentioned. The shoe is vibrated by means of cranks on the fan-shaft and connecting-rods $j$, as shown in fig. 2.

A fan, J, is arranged beneath the threshing-cylinder. A return-board, $k$, is arranged in and vibrates with the lower shoe. Suitable troughs $k^1\ k^2$ are also arranged in this shoe, which is likewise provided with a back-board, $k$, made in two parts and adjustable vertically by means of a slot and set-screw.

The driving-shaft $l$ is driven by a band from any suitable prime-mover encircling a pulley, L. The threshing-cylinder B is provided with a pulley, $b\ b$, at each end of its shaft, and may be driven from either or both ends from pulleys on the driving-shaft. The fan is driven by a band, M, from the driving-shaft, and the shaking-shoe is driven by a band, N.

In operation the attendant feeds the grain into the cylinder from the apron O. After being threshed, the grain and straw are thrown by the cylinder upon the longitudinally vibrating shaking-shoe, to which the cranks impart a peculiar rising and falling as well as a backward and forward movement. By means of this peculiar movement the ratchet-bars, $c$, impart an intermittent backward movement to the straw and grain. The straw passes off at the back of the shoe while the grain drops through the holes $f$ of the screen upon the inclined bottom F'. As the inclination of this bottom is too slight to cause the grain to slide off by its own gravity, I arrange a series of rakes or notched bars, G, transversely beneath the shaking-shoe, which, in its backward movement, descends close to the bottom, and thus draws the grain forward to the opening $g$, through which it drops upon the cant-board $h'$ in the shoe H, from which it passes on to the perforated corrugated screen I, and drops upon an inclined board, $k$, being all the while exposed to a blast from the fan.

The heavier grain rolls into the trough $k^1$, and is led into a suitable bin, while the lighter grain is blown against the inclined board K, and rolls into the trough $k^2$, leading to a separate receptacle. This board K may be raised or lowered to adjust it according to the force of the blast and the weight of the grain, by sliding it in its groove, and holding it by a slot and set-screw.

The pulley D' on the shaking-shoe shaft is provided with a counter-balance, $d'$, to make it run more steadily.

What I claim as my invention, and desire to secure by Letters Patent, is—

1. The longitudinally vibrating stair-shaped screen F, provided with rectangular perforations $f$ in the riser of the stair, as and for the purpose set forth.

2. The combination, as set forth, of the longitudinally vibrating, stair-shaped, rectangularly perforated screen, with the ratchet-ribs $c$, whereby the straw escapes backward and the grain forward.

3. The combination, substantially as set forth, of the stair-shaped perforated screen with reciprocating rakes G, which return the grain to the front of the machine after passing through the screen.

4. The combination, substantially as set forth, of the threshing-cylinder, longitudinally vibrating, rising and falling stair-shaped perforated screen, and reciprocating rakes, with the fan and second longitudinally vibrating shaking-shoe, for the purposes specified.

5. The combination, as described, with the fan of the shoe H, troughs $k^1$ $k^2$, and adjustable back-board K, for the purposes set forth.

In testimony whereof, I have hereunto subscribed my name.

LEVIS H. DAVIS.

Witnesses:
S. Y. WILSON,
JAMES H. RAY.